(12) United States Patent
Paisley et al.

(10) Patent No.: US 7,744,669 B2
(45) Date of Patent: Jun. 29, 2010

(54) PLUGGING MATERIAL FOR ALUMINUM TITANATE CERAMIC WALL FLOW FILTER MANUFACTURE

(75) Inventors: Robert John Paisley, Corning, NY (US); Patrick David Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 838 days.

(21) Appl. No.: 11/486,699

(22) Filed: Jul. 14, 2006

(65) Prior Publication Data

US 2008/0010960 A1 Jan. 17, 2008

(51) Int. Cl.
- B01D 24/00 (2006.01)
- B01D 39/06 (2006.01)
- B01D 39/14 (2006.01)

(52) U.S. Cl. .............................. 55/523; 55/522; 55/524
(58) Field of Classification Search ............ 55/522–524
See application file for complete search history.

(56) References Cited

U.S. PATENT DOCUMENTS

| | | | |
|---|---|---|---|
| 4,483,944 A | 11/1984 | Day et al. | 502/439 |
| 4,604,869 A * | 8/1986 | Yoshida et al. | 60/311 |
| 4,855,265 A | 8/1989 | Day et al. | 501/128 |
| 5,194,078 A * | 3/1993 | Yonemura et al. | 55/466 |
| 5,288,672 A * | 2/1994 | Gugel et al. | 501/134 |
| 5,290,739 A | 3/1994 | Hickman | 501/128 |
| 5,346,870 A | 9/1994 | Noguchi et al. | 501/136 |
| 5,846,276 A | 12/1998 | Nagai et al. | 55/523 |
| 6,620,751 B1 | 9/2003 | Ogunwumi | 501/134 |
| 6,809,139 B2 | 10/2004 | Fabian et al. | 524/430 |
| 6,849,181 B2 | 2/2005 | Ogunwumi et al. | 210/510.1 |
| 6,942,713 B2 | 9/2005 | Ogunwumi et al. | 55/523 |
| 7,001,861 B2 | 2/2006 | Beall et al. | 501/128 |
| 7,052,532 B1 * | 5/2006 | Liu et al. | 96/154 |
| 2004/0020846 A1 | 2/2004 | Ogunwumi et al. | 210/510.1 |
| 2004/0047774 A1 * | 3/2004 | Suwabe et al. | 422/177 |
| 2004/0092381 A1 | 5/2004 | Beall et al. | 501/134 |
| 2004/0128991 A1 * | 7/2004 | Sakamoto | 60/299 |
| 2004/0170803 A1 * | 9/2004 | Ichikawa | 428/116 |
| 2005/0091952 A1 | 5/2005 | Ogunwumi et al. | 55/523 |
| 2006/0021308 A1 | 2/2006 | Merkel | 55/523 |
| 2006/0051264 A1 * | 3/2006 | Son | 422/211 |
| 2006/0112669 A1 * | 6/2006 | Yamada et al. | 55/523 |
| 2006/0168927 A1 * | 8/2006 | Watanable et al. | 55/523 |
| 2006/0225390 A1 * | 10/2006 | Yoshida | 55/523 |

FOREIGN PATENT DOCUMENTS

| | | | |
|---|---|---|---|
| WO | WO2005005017 | * | 1/2005 |
| WO | 2006/015240 | | 2/2006 |
| WO | 2006/028506 | | 3/2006 |
| WO | 2006/130759 | | 12/2006 |

OTHER PUBLICATIONS

U.S. Appl. No. 11/186,466, filed Jul. 20, 2005, Kirk et al.

* cited by examiner

*Primary Examiner*—Walter D Griffin
*Assistant Examiner*—Amber Orlando
(74) *Attorney, Agent, or Firm*—Matthew B. McNutt

(57) ABSTRACT

Disclosed are plugging mixtures for a ceramic wall flow filter, comprising an aluminum titanate precursor reactive batch composition including an alumina source, a silica source, and a titania source; a sintering aid; an organic binder; and a liquid vehicle. Also disclosed are ceramic wall flow filters comprised of end plugs formed from the plugging mixtures of the present invention and methods for the manufacture thereof.

5 Claims, 1 Drawing Sheet

PLUGGING MATERIAL FOR ALUMINUM TITANATE CERAMIC WALL FLOW FILTER MANUFACTURE

BACKGROUND OF THE INVENTION

1. Field of the Invention

The present invention relates to the manufacture of porous ceramic particulate filters, and more particularly to improved materials and processes for sealing selected channels of porous ceramic honeycombs to form wall-flow ceramic filters therefrom.

2. Technical Background

Ceramic wall flow filters are finding widening use for the removal of particulate pollutants from diesel or other combustion engine exhaust streams. A number of different approaches for manufacturing such filters from channeled honeycomb structures formed of porous ceramics are known. The most widespread approach is to position cured plugs of sealing material at the ends of alternate channels of such structures which can block direct fluid flow through the channels and force the fluid stream through the porous channel walls of the honeycombs before exiting the filter. Illustrative of this approach is U.S. Pat. No. 6,809,139, which describes the use of sealing materials comprising cordierite-forming ($MgO$—$Al_2O_3$—$SiO_2$) ceramic powder blends and thermosetting or thermoplastic binder systems to form such plugs.

For most of their manufacturing history, Diesel Particulate Filters have been comprised of cordierite (magnesium alumino silicate) as the base ceramic material. However, cordierite has potential short comings when uncontrolled regeneration of the filter occurs during normal operation. Namely, the material typically melts at about 1435° C. and it has a relatively low heat capacity. In extreme cases this can cause melting of the filter matrix, and failure of the filter. To this end, aluminum titanate has been proposed as a viable alternate ceramic material for forming ceramic wall flow filters due to its higher melt temperature and relatively high heat capacity compared to cordierite. However, because aluminum titanate material is generally incompatible with cordierite, there is a need in the art for a plugging material that is compatible with aluminum titanate.

SUMMARY OF THE INVENTION

In accordance with the present invention there is an aluminum titanate plugging mixture suitable for forming aluminum titanate based ceramic wall flow filters. The mixtures can provide plugs exhibiting good physical and chemical stability in the moist, high-stress environment of a wall flow engine exhaust filter. Thus, plugs formed from these mixtures provide a stable, well-bonded and long-term seal with such wall flow filter materials.

The plugging mixtures provided in accordance with the invention generally comprise an aluminum titanate precursor reactive batch composition including an alumina source, a silica source, and a titania source; a sintering aid; an organic binder; and a liquid vehicle.

In another embodiment of the invention there is provided a porous ceramic wall flow filter body incorporating fired plugs in selected channels of the filter body, the plugs being formed from the plugging mixtures described herein and being well matched physically and chemically with the wall flow filter material and forming durable permanent seals with the channel walls of the body.

In still another embodiment, the present invention provides a method for manufacturing a porous ceramic wall flow filter having a ceramic honeycomb structure and a plurality of channels bounded by porous ceramic walls, with selected channels each incorporating a plug sealed to the channel wall. The method generally comprises the steps of providing a honeycomb structure having a plurality of channels bounded by parallel walls, selectively plugging at least one predetermined channel with a plugging mixture comprising an aluminum titanate precursor reactive batch composition; a sintering aid; an organic binder; and a liquid vehicle; to form a selectively plugged honeycomb structure; and firing the selectively plugged honeycomb structure under conditions effective to fire the plugging mixture and form a fired plug in the at least one selectively plugged channel.

Additional embodiments of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION

Figure 1:
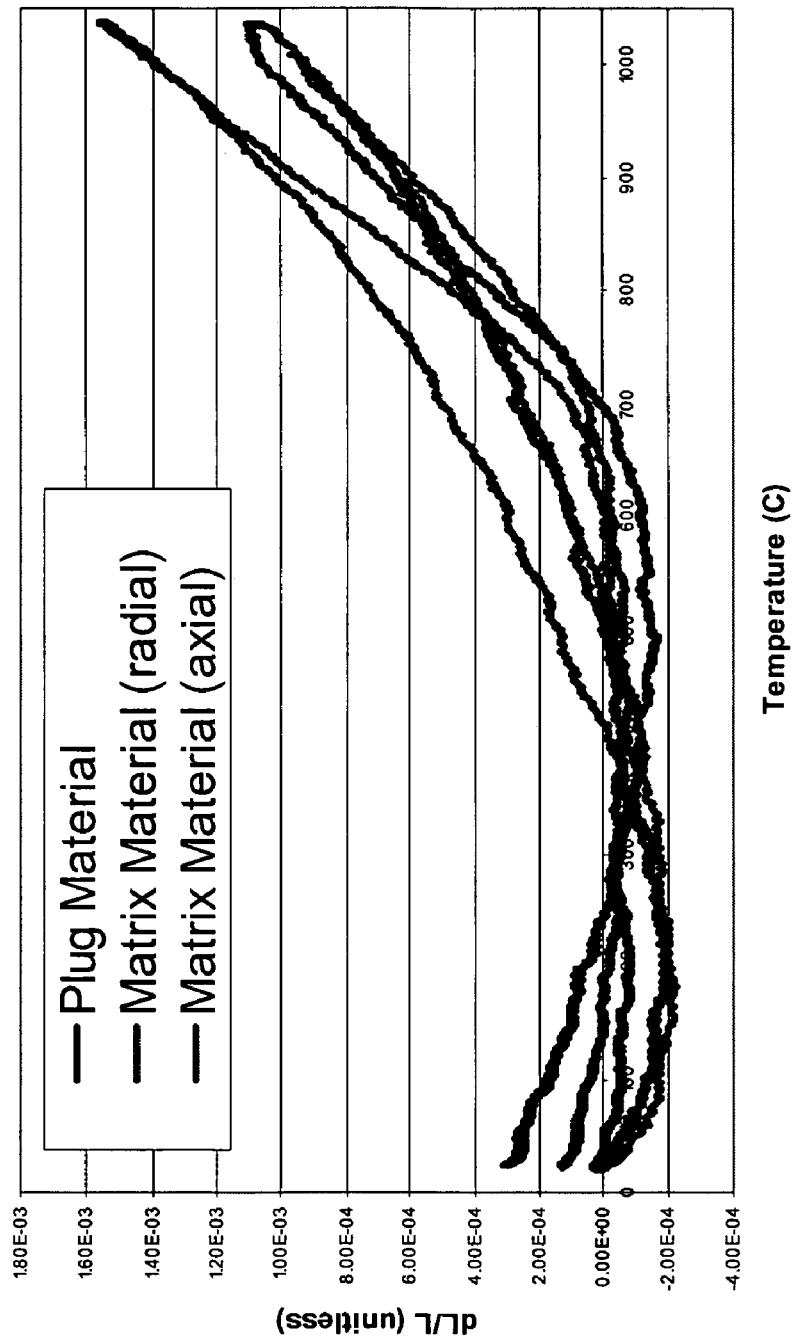
FIG. 1 illustrates a graphical comparison of the coefficient of thermal expansion of an exemplary second fire plugging mixture of the present invention and the coefficient of thermal expansion for an exemplary fired aluminum titanate honeycomb matrix composition.

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "sintering aid" includes embodiments having two or more such sintering aids unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, is based on the total weight of the composition or article in which the component is included.

As briefly summarized above, the present invention provides plugging mixtures suitable for use in forming an aluminum titanate ceramic wall flow filter. In one embodiment, the plugging mixture comprises an aluminum titanate based ceramic forming mixture that can be heat treated under conditions effective to provide a aluminum titanate based ceramic plug. In accordance with this embodiment, the plugging mixture comprises an aluminum titanate precursor reactive batch composition comprised of certain inorganic powdered raw materials, including an alumina source, a silica source, and a titania source.

An alumina source is a powder which when heated to a sufficiently high temperature in the absence of other raw materials, yield substantially pure aluminum oxide, and can include alpha-alumina, a transition alumina such as gamma-alumina or rho-alumina, hydrated alumina, gibbsite, boehmite, aluminum hydroxide, aluminum oxide, and mixtures thereof. The median particle size of the alumina source is preferably greater than 5 µm, including for example, median particle sizes up to 45 µm.

A silica source can include quartz, non-crystalline silica such as fused silica or sol-gel silica, silicone resin, zeolite, and diatomaceous silica, kaolin, and quartz. In one embodiment, the silica source is preferably selected from the group consisting of quartz and fused silica.

A titania source is preferably selected from, but not limited to, the group consisting of rutile and anatase titania.

These inorganic powdered raw materials are selected in amounts suitable to provided a sintered phase aluminum titanate ceramic composition comprising, as characterized in an oxide weight percent basis, from about 8 to about 15 percent by weight. $SiO_2$, from about 45 to about 53 percent by weight. $Al_2O_3$, and from about 27 to about 33 percent by weight. $TiO_2$. An exemplary inorganic aluminum titanate precursor powder batch composition can comprises approximately 10% quartz; approximately 47% alumina; approximately 30% titania; and approximately 13% additional inorganic additives. Additional exemplary non-limiting inorganic batch component mixtures suitable for forming aluminum titanate include those disclosed in U.S. Pat. Nos. 4,483,944; 4,855,265; 5,290,739; 6,620,751; 6,942,713; 6,849,181; U.S. Patent Application Publication Nos.: 2004/0020846; 2004/0092381; and in PCT Application Publication Nos.: WO 2006/015240; WO 2005/046840; and WO 2004/011386.

The inorganic powdered raw materials set forth above are then blended together with a sintering aid, a temporary organic binder, and a liquid vehicle. The addition of the sintering aid can enhance the strength of the ceramic plug structure after firing. It is preferred that the sintering aid be present in the mixture at a level of about 5 to 15%. Suitable sintering aids can generally include an oxide source of one or more metals such as strontium, barium, iron, magnesium, zinc, calcium, aluminum, lanthanum, yttrium, titanium, bismuth, or tungsten. In one embodiment, it is preferred that the sintering aid comprise a mixture of a strontium oxide source, a calcium oxide source and an iron oxide source. In another embodiment, it is preferred that the sintering aid comprise at least one rare earth metal. Still further, it should be understood that the sintering aid can be added to the plugging mixture in a powder and/or a liquid form.

The preferred liquid vehicle for providing a flowable or paste-like consistency to these plugging mixtures is water, although as mentioned other liquid vehicles exhibiting solvent action with respect to suitable temporary binders can be used. To this end, the amount of the liquid vehicle component can vary in order to impart optimum handling properties and compatibility with the other components in the ceramic batch mixture. Typically, the liquid vehicle content is usually present as a super addition in an amount in the range of from 15% to 60% by weight of the plasticized composition, and more preferably in the range of from 20% to 50% by weight of the plasticized composition.

Suitable temporary binders for use in plugging mixtures incorporating the preferred water vehicle include water soluble cellulose ether binder such as methylcellulose, hydroxypropyl methylcellulose, methylcellulose derivatives, and/or any combinations thereof. Particularly preferred examples include methyl cellulose and hydroxypropyl methyl cellulose. Typically, the organic binder is present in the plugging mixture as a super addition in an amount in the range of from 0.1 weight percent to 5.0 weight percent of the aluminum titanate precursor reactive batch composition, and more preferably, in an amount in the range of from 0.5 weight percent to 2.0 weight percent of the aluminum titanate precursor reactive batch composition.

The plugging mixture can optionally comprise at least one additional processing aid such as a plasticizer, lubricant, surfactant, and/or pore former. An exemplary plasticizer for use in preparing the plugging mixture is glycerine. An exemplary lubricant can be a hydrocarbon oil or tall oil. A pore former, may also be optionally used to optimize the porosity and median pore size of the resulting plug material. Exemplary and non-limiting pore formers can include graphite, starch, polyethylene beads, and/or flour.

Still further, plugging mixtures of the present invention can optionally comprise one or more pre-reacted inorganic refractory fillers having expansion coefficients reasonably well matched to those of common wall flow filter materials in which the plugging material can be used. Exemplary pre-reacted inorganic refractory fillers can include powders of silicon carbide, silicon nitride, cordierite, aluminum titanate, calcium aluminate, beta-eucryptite, and beta-spodumene, as well as refractory aluminosilicate fibers formed, for example, by the processing of aluminosilicate clay. The optional pre-reacted inorganic refractory fillers can be utilized in the plugging mixture to optimize or control the shrinkage and/or rheology of the plugging paste during firing process.

The plugging mixtures as described herein can be fired under conditions effective to react the aluminum titanate precursor reactive batch composition and to form a aluminum titanate plug material. The effective firing conditions will typically comprise firing the plugging material at a maximum firing temperature in the range of from range of from 1350° C. to 1500° C., and more preferably at a maximum firing temperature in the range of from 1375° C. to 1425° C.

As further summarized above, the plugging mixtures of the present invention can be used to provide an end plugged porous ceramic wall flow filter having a plurality of channels bounded by porous ceramic walls, with selected channels each incorporating an end plug formed from the plugging mixtures described herein and sealed to the channel wall. In particular, these plugging mixtures are well suited for providing end plugged aluminum titanate honeycomb bodies.

Accordingly, the present invention further provides a method for manufacturing a porous ceramic wall flow filter having a ceramic honeycomb structure and a plurality of channels bounded by porous ceramic walls, with selected channels each incorporating a plug sealed to the channel wall. The method comprises the steps of providing a honeycomb structure having a plurality of channels bounded by parallel walls, selectively plugging at least one predetermined channel with a plugging mixture as described above to form a selectively plugged honeycomb structure. The selectively plugged honeycomb structure can then be fired under conditions effective to form a fired plug in the at least one selectively plugged channel.

In one embodiment, the method can comprise a "single fire" process whereby the provided honeycomb structure can be a green body or unfired honeycomb body comprised of a dried plasticized aluminum titanate precursor batch composition, such that the conditions effective to fire the plugging mixture are also effective to convert the dried aluminum titanate ceramic precursor composition of the green body into an aluminum titanate ceramic composition. To this end, the unfired honeycomb green body can be selectively plugged with a plugging mixture substantially equivalent to the inorganic composition of the honeycomb green body. Thus, the plugging material can comprise either the same raw material sources or alternative raw material sources chosen to at least substantially match the drying and firing shrinkage of the green honeycomb.

As stated above, the conditions effective to simultaneously single fire the plugging mixture and the green body can comprise firing the selectively plugged honeycomb structure at a maximum firing temperature in the range of from 1350° C. to 1500° C., and more preferably at a maximum firing temperature in the range of from 1375° C. to 1425° C. After firing, the finished plugs should also exhibit similar thermal, chemical, and/or mechanical properties to that of the honeycomb body. Alternatively, different raw material choices could be made between the plug and matrix leading to further desirable property differences between the plug and matrix, such as plugs with lower elastic modulus.

An exemplary single fire plugging mixture formulation is set forth in Table 1 below.

TABLE 1

Exemplary Single Fire Plug Composition

| Batch Component | Parts by weight |
|---|---|
| Cerasil 300 Silica | 10.19 |
| SrCO3 | 8.00 |
| CaCO3 OMYA | 1.38 |
| A10 Alumina-325 mesh | 46.57 |
| Dupont Titania | 29.95 |
| AC714 Al(OH)3 | 3.71 |
| La2O3 | 0.20 |
| Methocel F240 | 1.00 |
| Water | 34.00 |

To prepare the exemplified plugging mixture of Table 1, the dry components of the batch can be dry-blended together to provide an intimate mixture. The liquid addition can then be added and the combination can then be mixed to form a paste roughly the consistency of peanut butter or cake frosting. This paste can then be forced into selected open cells of a green honeycomb matrix, in the desired plugging pattern and to the desired depth by one of several conventionally known plugging process methods. The plugged honeycomb structure and paste can then be dried, and simultaneously fired to the peak temperature in the range of from 1350° C. to 1500° C.

In an alternative embodiment, the method can comprise a "second fire" process whereby the provided honeycomb structure is already a fired aluminum titanate ceramic honeycomb structure. According to this embodiment, the conditions effective to fire the plugging mixture are effective to convert the plugging mixture into an aluminum titanate ceramic composition. Still further, also according to this embodiment it is desirable to selectively plug one or more channels of the honeycomb body with a plugging mixture that will result in a plug with physical properties similar to the honeycomb, but which can be fired without altering the properties of the honeycomb. For example, a plugging mixture according to this embodiment can be chosen to lower the peak firing temperature required for firing of the plugs to a temperature below the peak firing temperature of the fired ceramic honeycomb body. Still further, the plugging mixture can also be chosen to minimize the level of shrinkage that occurs during drying and/or firing.

Once again, the conditions effective to fire the plugging mixture and the fired honeycomb body can comprise firing the selectively plugged honeycomb structure at a maximum firing temperature in the range of from 1350° C. to 1500° C., and more preferably at a maximum firing temperature in the range of from 1375° C. to 1425° C. After firing, the finished plugs should also exhibit similar thermal, chemical, and/or mechanical properties to that of the honeycomb body. Alternatively, the properties of the plugs may be different, for example, having lower or higher heat capacity, lower elastic modulus, lower or higher porosity. In one embodiment, it is desirable for the firing conditions effective to convert the plugging mixture into an aluminum titanate ceramic composition to comprise firing at a maximum temperature that is lower than the maximum temperature required for firing the honeycomb matrix.

An exemplary "second fire" aluminum titanate plugging mixture is set forth in Table 2 below. The exemplary composition comprises a substitution of calcium for strontium in order to lower the peak firing temperature of the paste to 1405-1430° C., which is about 50-70° C. lower than the peak firing temperature of the honeycomb body in the absence of the calcium component. This can allow the exemplary plugging material to be fired without altering the properties of the fired honeycomb.

TABLE 2

Second Fire Plug Composition A

| Batch Component | Part by Weight |
|---|---|
| A10 Alumina-325 | 202.0 |
| Silverbond 200 Silica | 43.6 |
| Dupont Titania | 118.8 |
| SrCO$_3$-325 | 15.8 |
| Hematite (Fe$_2$O$_3$) | 0.9 |
| CaCO$_3$ OMYA | 18.8 |
| Methocel A4M | 3.0 |
| DI Water | 100.0 |

To prepare the exemplified plugging mixture of Table 2, the dry components of the batch can be dry-blended together to provide an intimate mixture. The water can then be added and the combination can then be mixed to form a paste roughly the consistency of peanut butter or cake frosting. This paste can then be forced into selected open cells of a fired honeycomb, in the desired plugging pattern and to the desired depth by one of several conventionally known plugging process methods. The plugged honeycomb structure and paste can then be dried, and fired to the peak temperature for a hold or soak time of one or more hours.

A second exemplary "second fire" aluminum titanate plugging mixture is set forth in Table 3 below. This exemplary composition again comprises a substitution of calcium for strontium in order to lower the peak firing temperature of the paste.

TABLE 3

Second Fire Plug Composition B

| Batch Component | Weight % |
|---|---|
| MA50 Alumina (K.C. Abrasives) | 50.61% |
| Cerasil 300 Silica | 11.42% |
| Ti-Pure R100 titania | 30.22% |
| CaCO$_3$ OMYA | 7.76% |
| Potato Starch | 15% |
| Methocel A4M | 0.5% |
| DI Water | 20% |

To prepare the exemplified plugging mixture of Table 3, the dry components of the batch are dry-blended together to provide an intimate mixture. A superaddition of 15% potato starch, 20% water, and 0.5% methocel was then added. The combination was then mixed to form a paste roughly the consistency of peanut butter or cake frosting. This paste can then be forced into selected open cells of a fired honeycomb matrix, in the desired plugging pattern and to the desired depth by one of several conventionally known plugging process methods. In this example, the plugging material sample was dried and fired at approximately 1390° C. for 4 hours. A comparative matrix material was fired at approximately 1450° C. for 8 hours. The thermal expansion of the plug material and the matrix material were then tested and compared to determine the match between the plug material fired at 1390 and the matrix fired at 1450 C. The results of the thermal expansion study are reflected in FIG. 1, wherein it can be seen that the thermal expansion of the plug material and the matrix material differed by an average of only $2\times10^{-7}/°$ C.

The invention claimed is:

1. A method for manufacturing a porous ceramic wall flow filter having a ceramic honeycomb structure and a plurality of channels bounded by porous ceramic walls, with selected channels each incorporating a plug sealed to the channel wall, comprising the steps of:

providing a fired honeycomb structure having a plurality of channels bounded by parallel walls, wherein the honeycomb structure was formed from a first aluminum titanate batch composition and fired at a peak firing temperature in the range of 1350° C. to 1500° C., selectively plugging at least one predetermined channel with a plugging mixture comprising an aluminum titanate batch composition different from the first aluminum titanate batch composition of the fired honeycomb structure; a sintering aid; an organic binder; and a liquid vehicle; to form a selectively plugged honeycomb structure; and firing the selectively plugged honeycomb structure under conditions effective to fire the plugging mixture and form a fired plug in the at least one selectively plugged channel, wherein the conditions effective to fire the plugging mixture comprise firing at a temperature at least about 50° C. lower than the peak firing temperature.

2. The method of claim 1, wherein the fired honeycomb structure is a fired aluminum titanate ceramic honeycomb structure.

3. The method of claim 1, wherein the conditions effective to fire the plugging mixture are effective to convert the plugging mixture into an aluminum titanate ceramic composition.

4. The method of claim 1, wherein the conditions effective to fire the plugging mixture further comprise firing the selectively plugged honeycomb structure at a maximum firing temperature in the range of from 1350° C. to 1500° C.

5. The method of claim 1, wherein the conditions effective to fire the plugging mixture further comprise firing the selectively plugged honeycomb structure at a maximum firing temperature in the range of from 1375° C. to 1425° C.

* * * * *